(12) United States Patent
Melvin

(10) Patent No.: US 6,804,767 B1
(45) Date of Patent: Oct. 12, 2004

(54) METHOD AND SYSTEM FOR AUTOMATIC ADDRESS TABLE RESHUFFLING IN NETWORK MULTIPLEXERS

(75) Inventor: Bruce W. Melvin, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/449,839

(22) Filed: Nov. 26, 1999

(51) Int. Cl.[7] .............................................. G06F 12/00
(52) U.S. Cl. ........................ 711/216; 711/217; 711/220
(58) Field of Search ................................. 370/351, 352, 370/353, 354, 355, 356, 389, 392, 395.32; 711/202, 206, 209, 211, 212, 216, 217, 220, 221

(56) References Cited

U.S. PATENT DOCUMENTS

| | | | | | |
|---|---|---|---|---|---|
| 5,414,704 | A | * | 5/1995 | Spinney | ........................ 370/60 |
| 5,920,900 | A | * | 7/1999 | Poole et al. | ................. 711/216 |
| 6,115,802 | A | * | 9/2000 | Tock et al. | .................. 711/216 |
| 6,173,384 | B1 | * | 1/2001 | Weaver | ....................... 711/216 |
| 6,266,705 | B1 | * | 7/2001 | Ullum et al. | ................ 709/238 |
| 6,308,218 | B1 | * | 10/2001 | Vasa | ........................... 709/238 |
| 6,310,876 | B1 | * | 10/2001 | Egbert | ......................... 370/389 |

* cited by examiner

*Primary Examiner*—Steven H. D. Nguyen
*Assistant Examiner*—Duc Duong

(57) ABSTRACT

A method and system for storing and accessing associations between network addresses and ports within a network multiplexer. The method and system implement an address table containing indexed address/port pairs. Multiple hash functions are applied to an input address in order to identify indexes of address table entries in which the input address may be stored. If the entries indexed by application of the multiple hash functions to an input source address are neither empty nor contain the input source address, then contents of one of the entries is discarded, and the input source address is placed into the now empty entry. Over time, discarded addresses are re-entered into the address table in a fashion equivalent to hash table reshuffling, but the computational inefficiencies inherent in hash table reshuffling are deferred and largely avoided.

9 Claims, 21 Drawing Sheets

| source | hash 1 | hash 2 | hash 3 | hash 4 | hash 5 | hash 6 |
|---|---|---|---|---|---|---|
| 19239579 | 582 | 149 | 678 | 860 | 340 | 980 |
| 134873423 | 547 | 728 | 91 | 849 | 149 | 280 |
| 923376437 | 121 | 673 | 52 | 373 | 124 | 489 |
| 849904355 | 489 | 893 | 495 | 163 | 406 | 805 |

| ADDRESS | PORT |
|---------|------|
| NODE A  | X    |
| PRINTER | X    |
| NODE B  | Y    |
| NODE C  | Y    |

| ADDRESS | MEDIUM |
|---------|--------|
| NODE A  | 1      |
| PRINTER | 1      |
| NODE B  | 2      |
| NODE C  | 2      |

| PORT | MEDIUM |
|------|--------|
| X    | 1      |
| Z    | 1      |
| Y    | 2      |
| W    | 2      |

```
1  const NUM_HASH_ITER = 6;
2  const TAB_SIZE = 1000;
3  const ROW_SIZE = 2;
4  const SOURCE_COLUMN = 0;
5  const PORT_COLUMN = 1;
6
7  class hash
8  {
9      private:
10             int tab [ROW_SIZE][TAB_SIZE];
11
12     public:
13             bool hashAddress(int source, int port);
14             hash();
15             virtual ~hash();
16 };
17
18
19 bool hash::hashAddress(int source, int port)
20 {
21     int inter, i, dex;
22
23     inter = (source & 0xc) >> 2;
24     inter += (source & 0xe0) >> 3;
25     inter += (source & 0x3c00) >> 5;
26     inter += (source & 0x3e0000) >> 8;
27     inter += (source & 0x3f000000) >> 10;
28     dex = (inter / 3) % TAB_SIZE;
29     if (tab[SOURCE_COLUMN][dex] == 0)
30     {
31             tab[SOURCE_COLUMN][dex] = source;
32             tab[PORT_COLUMN][dex] = port;
33             return TRUE;
34     }
35     else if (tab[SOURCE_COLUMN][dex] == source)
36     {
37             tab[PORT_COLUMN][dex] = port;
38             return TRUE;
39     }
40     else return FALSE;
41 }
```

*Fig. 12*

```
1  bool hash::hashAddress(int source, int port)
2  {
3      int inter, i, dex;
4
5      inter = (source & 0xc) >> 2;
6      inter += (source & 0xe0) >> 3;
7      inter += (source & 0x3c00) >> 5;
8      inter += (source & 0x3e0000) >> 8;
9      inter += (source & 0x3f000000) >> 10;
10
11     for (i = 0; i < NUM_HASH_ITER; i++)
12     {
13         dex = (inter / (i * 2 + 3)) % TAB_SIZE;
14         if (tab[SOURCE_COLUMN][dex] == 0)
15         {
16             tab[SOURCE_COLUMN][dex] = source;
17             tab[PORT_COLUMN][dex] = port;
18             return TRUE;
19         }
20         else if (tab[SOURCE_COLUMN][dex] == source)
21         {
22             tab[PORT_COLUMN][dex] = port;
23             return TRUE;
24         }
25     }
26     return FALSE;
27 }
```

*Fig. 14*

| source    | hash 1 | hash 2 | hash 3 | hash 4 | hash 5 | hash 6 |
|-----------|--------|--------|--------|--------|--------|--------|
| 19239579  | 582    | 149    | 678    | 860    | 340    | 980    |
| 134873423 | 547    | 728    | 91     | 849    | 149    | 280    |
| 923376437 | 121    | 673    | 52     | 373    | 124    | 489    |
| 849904355 | 489    | 893    | 495    | 163    | 406    | 805    |

*Fig. 15*

| source | h1 (source) | h2 (source) |
|--------|-------------|-------------|
| A | 7 | 29 |
| B | 18 | 7 |
| C | 29 | 9 |
| D | 34 | 18 |
| E | 7 | 25 |
| F | 15 | 29 |
| G | 9 | 23 |
| H | 13 | 7 |
| I | 31 | 25 |
| J | 3 | 18 |
| K | 34 | 12 |
| L | 37 | 29 |
| M | 15 | 10 |
| N | 9 | 20 |
| O | 27 | 23 |

*Fig. 18A*

```
1  const NUM_HASH_ITER = 6;
2  const TAB_SIZE = 1000;
3  const ROW_SIZE = 2;
4  const SOURCE_COLUMN = 0;
5  const PORT_COLUMN = 1;
6  const RESHUFFLE_LEVELS = 4;
7
8  class hash
9  {
10     private:
11            int tab[ROW_SIZE][TAB_SIZE];
12
13     public:
14            int hashAddress(int source, int hfunc);
15            bool hash::reshuffleHashAddress(int source, int port);
16            hash();
17            virtual ~hash();
18 };
19
20 int hash::hashAddress(int source, int hfunc)
21 {
22     int inter, dex;
23
24     inter = (source & 0xc) >> 2;
25     inter += (source & 0xe0) >> 3;
26     inter += (source & 0x3c00) >> 5;
27     inter += (source & 0x3e0000) >> 8;
28     inter += (source & 0x3f000000) >> 10;
29     dex = (inter / (hfunc * 2 + 3)) % TAB_SIZE;
30     return dex;
31 }
32
33 bool hash::reshuffleHashAddress(int source, int port)
34 {
35     int possible_slot;
36     int dexes[RESHUFFLE_LEVELS];
37     int h0, h1, h2, h3;
38
39     for (h0 = -1; h0 < NUM_HASH_ITER; h0++)
40     {
41      for (h1 = -1; h1 < NUM_HASH_ITER; h1++)
42      {
43       for (h2 = -1; h2 < NUM_HASH_ITER; h2++)
44       {
45        for (h3 = 0; h3 < NUM_HASH_ITER; h3++)
46        {
47          dexes[3] = hashAddress(source, h3);
48          possible_slot = 3;
49          if (h2 >= 0)
50          {
51            dexes[2] = hashAddress(tab[SOURCE_COLUMN][dexes[3]], h2);
52            possible_slot = 2;
53            if (h1 >= 0)
54            {
55              dexes[1] = hashAddress(tab[SOURCE_COLUMN][dexes[2]], h1);
56              possible_slot = 1;
57              if (h0 >= 0)
```

*Fig. 20A*

```
58              {
59                  dexes[0] = hashAddress(tab[SOURCE_COLUMN][dexes[1]], h0);
60                  possible_slot = 0;
61              }
62          }
63      }
64      if (tab[SOURCE_COLUMN][dexes[possible_slot]] == 0)
65      {
66          while (possible_slot < RESHUFFLE_LEVELS - 1)
67          {
68              tab[SOURCE_COLUMN][dexes[possible_slot]] =
69                  tab[SOURCE_COLUMN][dexes[possible_slot - 1]];
70              tab[PORT_COLUMN][dexes[possible_slot]] =
71                  tab[PORT_COLUMN][dexes[possible_slot - 1]];
72              possible_slot++;
73          }
74          tab[SOURCE_COLUMN][dexes[possible_slot]] = source;
75          tab[PORT_COLUMN][dexes[possible_slot]] = port;
76          return TRUE;
77      }
78     }
79    }
80   }
81  }
82  return FALSE;
83 }
```

*Fig. 20B*

```
1  const NUM_HASH_ITER = 6;
2  const TAB_SIZE = 1000;
3  const ROW_SIZE = 2;
4  const SOURCE_COLUMN = 0;
5  const PORT_COLUMN = 1;
6
7  class hash
8  {
9      private:
10             int tab [ROW_SIZE][TAB_SIZE];
11             int rrobin;
12
13     public:
14             void hashAddress(int source, int port);
15             hash();
16             virtual ~hash();
17 };
18
19 void hash::hashAddress(int source, int port)
20 {
21     int inter, i, dexes[NUM_HASH_ITER];
22
23     inter = (source & 0xc) >> 2;
24     inter += (source & 0xe0) >> 3;
25     inter += (source & 0x3c00) >> 5;
26     inter += (source & 0x3e0000) >> 8;
27     inter += (source & 0x3f000000) >> 10;
28     for (i = 0; i < NUM_HASH_ITER; i++)
29     {
30             dexes[i] = (inter / (i * 2 + 3)) % TAB_SIZE;
31             if (tab[SOURCE_COLUMN][dexes[i]] = 0)
32             {
33                     tab[SOURCE_COLUMN][dexes[i]] = source;
34                     tab[PORT_COLUMN][dexes[i]] = port;
35                     return;
36             }
37             else if (tab[SOURCE_COLUMN][dexes[i]] == source)
38             {
39                     tab[PORT_COLUMN][dexes[i]] = port;
40                     return;
41             }
42     }
43     tab[SOURCE_COLUMN][dexes[rrobin]] = source;
44     tab[PORT_COLUMN][dexes[rrobin]] = port;
45     if (++rrobin == NUM_HASH_ITER) rrobin = 0;
46 }
```

*Fig. 21*

METHOD AND SYSTEM FOR AUTOMATIC ADDRESS TABLE RESHUFFLING IN NETWORK MULTIPLEXERS

TECHNICAL FIELD

The present invention relates to the efficient construction and access of address tables within network mutliplexers and, in particular, to a method and system for efficiently adding addresses to an address table of limited size until the address table is nearly full and for efficiently locating entries within the address table.

BACKGROUND OF THE INVENTION

Bridges, switches, and routers are networking devices that interconnect two or more distinct physical communication network media, such as ethernets, token rings, and optical fibre media. Network multiplexers forward communications packets received from a first network medium via a first network multiplexer port to one or more destination communications network media via one or more destination network multiplexer ports. In forwarding a communications packet, the network multiplexer accesses an address table that contains a set of associations between network addresses and network multiplexer ports. The network multiplexer compiles the address table over time, monitoring incoming communications packets for newly recognized source addresses that do not yet exist in the address table. Those newly recognized addresses are entered into the address table in association with an indication of the port through which the communications packet was received. Subsequently, when a communications packet is received with a destination address matching an address already entered into the address table, the network multiplexer can determine to which port to forward the communications packet.

The memory resources within a network multiplexer are limited, for practical, technical, and economic reasons. Even in the case where a network multiplexer serves only to link multiple ethernets, an address table could potentially contain many trillions of entries. For this reason, and because network devices may be relocated from one network medium to another, it is technically impractical to hardwire an address table within a network multiplexer. Instead, the network multiplexer dynamically constructs an address table. In order to dynamically construct the address table, the network multiplexer requires a method for storing associations between discovered network addresses and ports quickly and economically within an address table of finite size so that the network multiplexer can quickly determine whether an incoming destination address occurs within the address table and, if so, determine the port associated with that destination address. Content addressable memories may be used for storing the address table. These are memories combined with a huge amount of hardware logic that allows memory locations to be addressed by the contents of the memory locations. However, content addressable memories are currently too expensive and too large for use in mass-produced network multiplexers. Alternatively, software or firmware routines, or logic circuits, that implement a hash table within random access memory ("RAM") can provide functionality similar to content addressable memories. A discrete mathematical function is applied to an address to produce an index into a memory region in which the entry for that address is stored. However, because the discrete mathematical function maps a relatively large number of different possible addresses into a much smaller number of memory locations, collisions invariably occur between different addresses. Currently-available hash table implementations address the collision problem in order to attempt to maximize the capacity of a finite-sized address table, but characteristically do so at the expense of increased computational complexity and decreased computational efficiency. Network multiplexer designers, architects, and manufacturers have therefore recognized a need for an efficient and economical address table implementation that avoids the use of content addressable memories and avoids the complexity and inefficiency of currently-available hash table implementations.

SUMMARY OF THE INVENTION

The present invention provides a computationally and memory-efficient implementation of an address table for use in a network multiplexer. This implementation employs multiple hash functions as well as hash table reshuffling. However, the implementation is markedly more efficient and more computationally straightforward than currently-available implementations because hash table reshuffling is largely deferred to future address entry operations. The computational efficiency provided by the present invention is important in network multiplexers that store and forward hundreds or thousands of communications packets per second and the computational straightforwardness is necessary for designing integrated circuits that implement the address table in logic circuits.

BRIEF DESCRIPTION OF THE DRAWINGS

FIGS. 6 shows a portion of an address table for the network multiplexer of FIG. 5.

FIG. 12 shows a simple C++-like pseudo-code implementation of the hash function illustrated in FIG. 10.

FIG. 14 shows an alternate implementation of the member function "hashAddress" that applies a series of different hash functions to a source address in an attempt to find an available address table entry.

FIG. 15 shows a table containing the various indexes calculated by application of successive hash functions to a number of different source addresses.

FIGS. 18A–18C illustrate the technique of hash table reshuffling.

FIGS. 20A–B show a C++-like pseudo-code implementation of hash table reshuffling.

FIG. 21 shows an implementation of the deferred hash table reshuffling technique of the present invention.

DETAILED DESCRIPTION OF THE INVENTION

Figure 1:
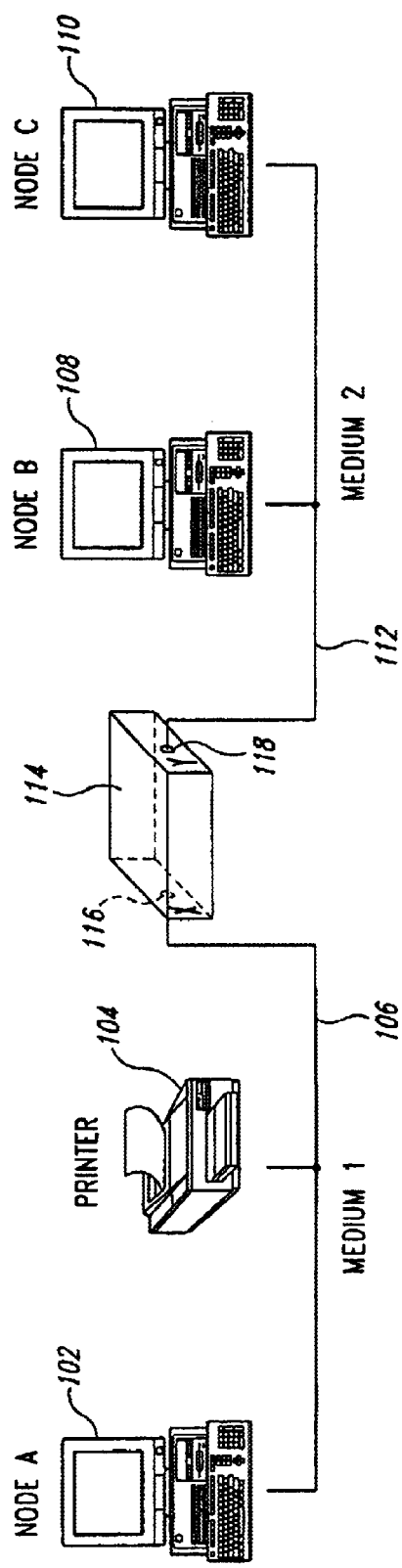
FIG. 1 displays a simple communications network comprising two physically separate network media linked together by a network multiplexer.

Switches, routers, and bridges are multi-port communications network infrastructure devices that forward communications network packets received from transmitting network devices on or more source network media to receiving network devices on one or more destination network media. Switches, routers, and bridges are all examples of network multiplexers. FIG. 1 displays a simple communications network comprising two physically separate network media linked together by a network multiplexer. A network medium may be a single ethernet, token ring, or other similar communications network physical transport medium to which a number of network devices, such as computers, printers, disk arrays, and network multiplexers, are attached. In FIG. 1, a computer system 102 and a printer 104 are linked together via a first network medium 106. A second computer system 108 and a third computer system 110 are linked together by a second network medium 112. Both the first and second network media 106 and 112 are linked together by a network multiplexer 114. In the following discussion, the first, second, and third computer systems are referred to as "node A," node B," and "node C," respectively. The network multiplexer 114 allows node A 102 and the printer 104, linked together via network medium 106, to communicate with node B 108 and node C 110, linked together by network medium 112. The network multiplexer contains two ports, port "X" 116 and port "Y" 118. The network multiplexer 114 receives communications packets, or messages, from node A 102 and the printer 104 through port X 116 and transmits communications packets to node A 102 and the printer 104 through port "X" 116. In similar fashion, the network multiplexer 114 receives communications packets from, and transmits communications packets to, node B 108 and node C 110 via port "Y" 118.

Figure 2:
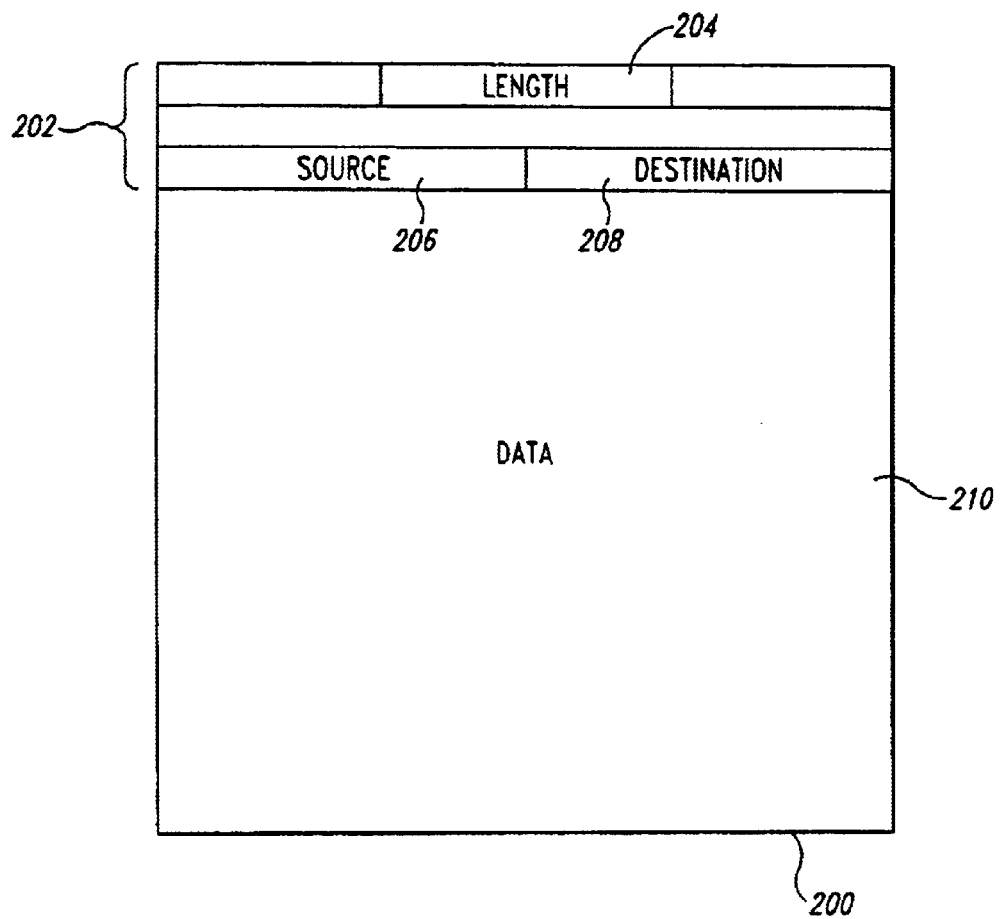
FIG. 2 shows a generalized representation of a communications packet.

FIG. 2 shows a generalized representation of a communications packet. A communications packet 200 is a sequence of computer bytes. Communications packets generally vary in length. A header 202 is a first, fixed-length and fixed-format portion of a communications packet. The header contains, among other information, numerical fields that indicate the total length of the communications packet 204, the address of the network device that originally transmitted the communications packet 206, and the address of the network device to which the communications packet is directed 208. Following the header is a variable length field that contains the computer data included in the communications packet 210. Depending on the type of communications medium, the header may contains many additional fields, including a sequence number and error correction codes, and the fields may occupy many different relative positions to one another and to the start of the header. The contents of the source and destination fields 206 and 208 of the header 202 are referred to as the "source address" and "destination address," respectively, in the following discussion.

Figure 3:
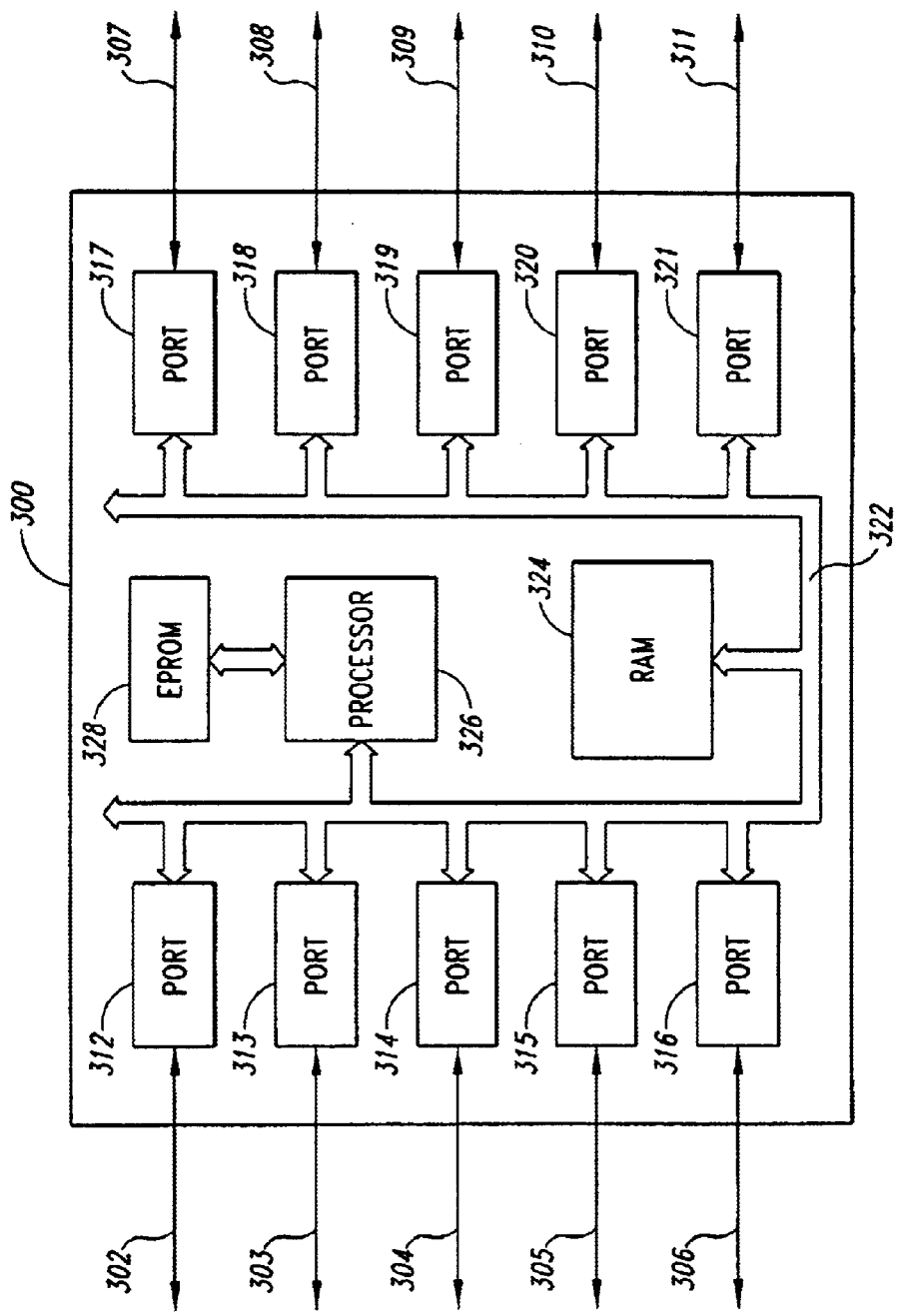
FIG. 3 shows a generalized block diagram of a network multiplexer.

FIG. 3 shows a generalized block diagram of a network multiplexer. The network multiplexer 300 is connected, in FIG. 3, to ten different network media 302–311. Within the network multiplexer, each network medium 302–311 is electronically connected to a port 312–321. Each port comprises a transceiver device that receives and transmits communications packets and control logic that interprets certain fields of the communications packets in order to implement the lower level networking protocols for the type of network media to which the port is connected, and, additionally, interfaces to an internal communications bus 322 and memory 324. A port may store received communications packets into known locations in the memory 324 and may retrieve communications packets for transmission from known locations in the memory 324. A network multiplexer may also contain a processor 326 and non-volatile memory 328 that stores control routines executed by the processor 326. Alternatively, in place of a processor and non-volatile memory, a network multiplexer may employ complex logic to control forwarding of communications packets from one port to another, or may employ a combination of a processor and specialized logic.

When a network multiplexer receives a communications packet from a port, the network multiplexer must determine whether to forward the received communications packet to another port or ports, or to drop the received communications packet. For example, if the network multiplexer 114 of FIG. 1 receives a communications packet from port X 118 with source address corresponding to node A 102 and destination address corresponding to the printer 104, the network multiplexer 114 may simply drop the received communications packet without forwarding the communications packet to port Y 118, assuming that network medium 106 is a broadcast-type medium in which the communications controllers of all networking devices connected to the network medium examine each communications packet transferred through the network medium. In the present case, both the printer 104 and the network multiplexer 114 will receive the communications packet transmitted from node A 102 to the printer 104, and there is no need for the network multiplexer to transmit the communications packet to the printer a second time. In fact, a second, duplicate transmission may cause problems for a receiving node, and for the node that originally transmitted the packet. However, in the case that node A 102 transmits a communications packet to node B 108, the network multiplexer 114 receives the transmitted communications packet on port X 116 and needs to transmit the communications packet via port Y 118 to network medium 112 in order for node B 108 to receive the communications packet, since because network media 106 and 112 are physically distinct. The network multiplexer 114 in FIG. 1 is the only bridge, or link, between network medium 106 and network medium 112. When the network media interconnected by a network multiplexer are of the same type and employ universal source and destination addresses, the network multiplexer may simply forward received packets. In other cases, the network multiplexer may need to reformat received packets prior to forwarding them.

Unfortunately, the network multiplexer does not contain a hard-wired, destination-address-to-port translation mechanism. Thus, in the previous example, when the network multiplexer 114 receives a communications packet on port X 116 from node A 102 addressed to node B 108, the network multiplexer has no hard-wired translation mechanism to determine to which of network media 106 and 112 node B is connected. In the case of ethernet network media, for example, 48-bit source and destination addresses are employed. Thus, there may be trillions of different valid, unique ethernet device addresses. Ethernet devices receive their unique addresses at the time of manufacture, prior to their connection to a particular ethernet. Ethernet devices may be removed from one ethernet and connected to another ethernet following their initial connection to an ethernet. There is simply no way to assign an a priori correspondence between ethernet addresses and particular network media, and, even if there were a way to make an a priori assignment, the size of the assignment table would exceed any currently-available technology for economically storing such a volume of information within a network multiplexer.

Figures 4, 6A, 6B:
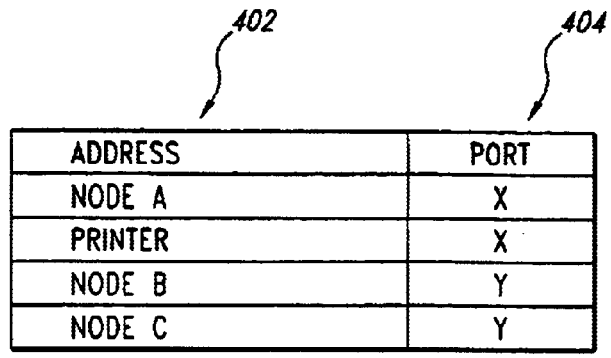
FIG. 4 shows an address table for the network of FIG. 1.

Rather than employing a hard-wired translation mechanism, network multiplexers commonly learn the correspondence between network addresses and ports over time, and store the correspondences in an address table. FIG. 4 shows an address table for the network of FIG. 1. Each network address in the first column 402 of the address table is paired with a corresponding port in the second column 404 of the address table. Before the network multiplexer receives a communications packet originally transmitted by a network device having a particular network address, that particular network address will not appear in the address table. When the network multiplexer receives a communications packet with a destination network address that is not currently contained in the address table, the network multiplexer must forward the received communications packet to all the different network media to which the network multiplexer is connected, including the network medium from which the communications packet was received, since the network multiplexer cannot determine to which port the destination address corresponds. After the network multiplexer receives a communications packet from a network device having the particular network address, a correspondence between the particular network address and the port through which the communications packet was received is entered by the network multiplexer into the address table. Then, whenever the network multiplexer receives a communications packet having that particular network address as the destination address of the communications packet, the network multiplexer can find the correspondence between the particular network address and a port in the address table, and can forward the communications packet to the correct port. In the case that the communications packet is received from the same port through which the communications packet would otherwise be forwarded, the network multiplexer can simply drop the packet without forwarding it.

Figure 5:
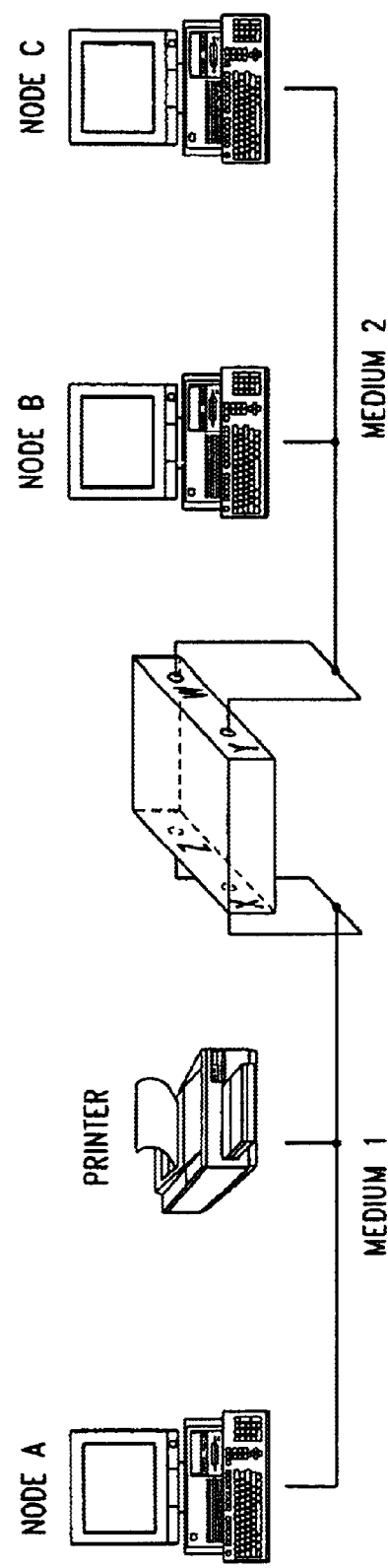
FIG. 5 displays a network multiplexer interconnecting eight different network media.

Network multiplexers may be connected to a large number of different network media through a large number of corresponding ports. FIG. 5 displays a network multiplexer interconnecting eight networks, and FIG. 6 shows a portion of an address table for this network multiplexer. The address table 602 in FIG. 6 may contain many different network addresses corresponding to a particular port, such as network addresses 604–607 associated with the network medium connected to the network multiplexer via port 8.

Figure 7:
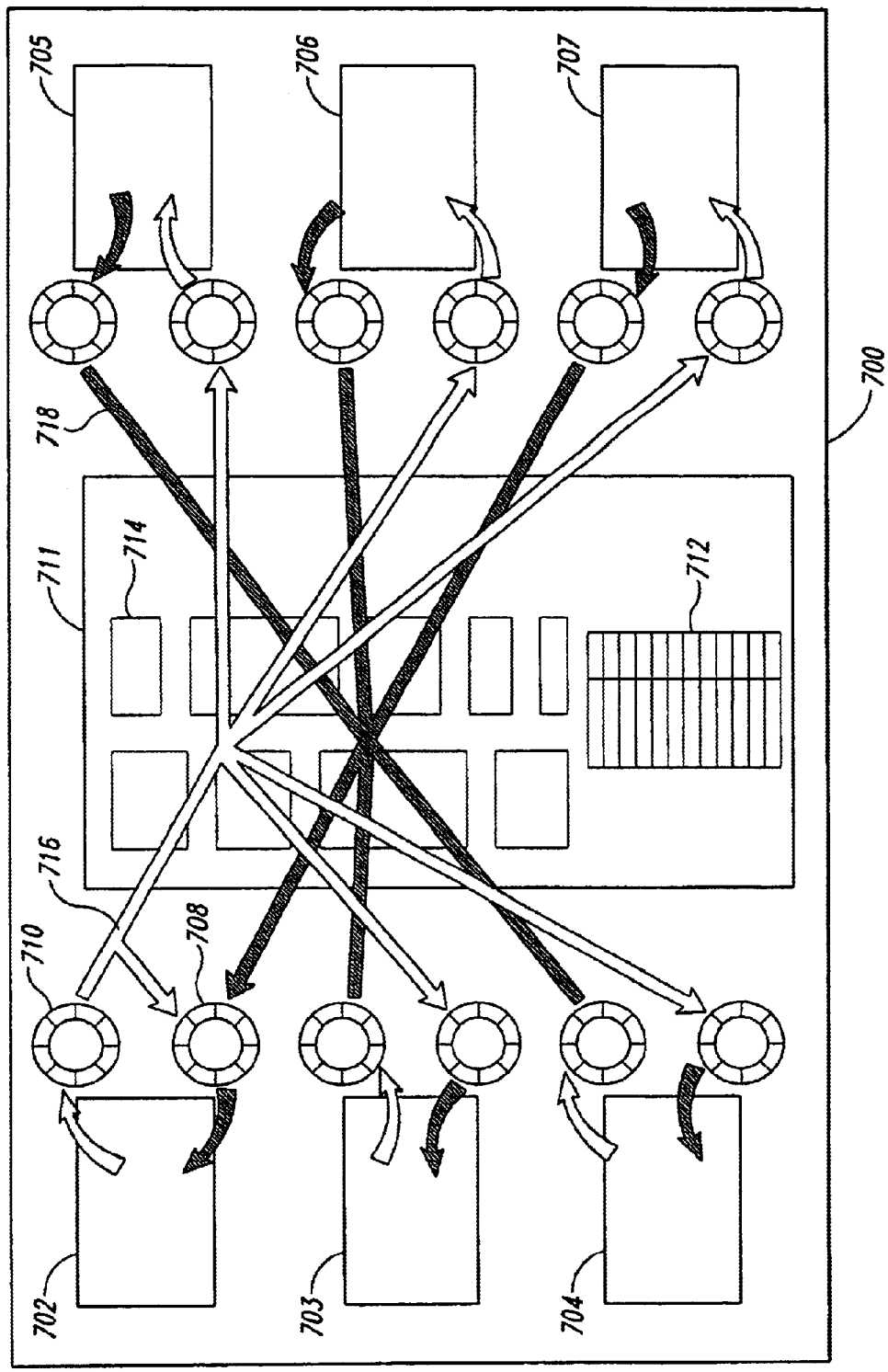
FIG. 7 illustrates the logical components of a network multiplexer.

FIG. 7 illustrates the logical components of a network multiplexer. The network multiplexer 700 of FIG. 7 includes six ports 702–707. Each port is associated with a transmit queue and a receive queue, such as the transmit queue 708 and the receive queue 710 associated with port 702. Both transmit and receive queues are composed of contiguous memory locations within the memory of the network multiplexer (324 in FIG. 3). The memory of the network multiplexer (324 in FIG. 3) is shown in FIG. 7 as also containing an address table 712 and various stored communications packets, such as stored communications packet 714. The transmit and receive queues, such as transmit and receive queues 708 and 710, contain message descriptors that indicate the memory locations of stored communications packets, such as stored communications packet 714, and may contain additional information fields. The communications controller components of the ports receive communications packets for transmission via message descriptors contained in transmit queues, and place communications packets received from the corresponding network medium into memory locations described by message descriptors contained in receive queues. A principle task of the network multiplexer is to move message descriptors from receive queues to transmit queues using information contained in the source and destination fields of the communications packet headers referenced by the message descriptors along with information stored in address table 712. For example, in FIG. 7, the multi-headed arrow 716 illustrates the transfer of message descriptors from the receive queue 710 of port 702 to the transmit queues of the remaining ports 703–707, and the multi-headed arrow 718 indicates the transfer of message descriptors from the receive queues of ports 703–707 to the transmit queue 708 of port 702. Equivalent systems of arrows can be drawn with respect to each of the remaining ports 703–707.

When the port 702 receives a communications packet from its corresponding network medium, the port obtains a memory location allocated for storage of an incoming communications packet, places the communications packet into memory starting at the obtained memory location, and stores a reference to the memory location, possibly along with additional information, into a message descriptor in the receive queue 710. Then, the network multiplexer moves the message descriptor that describes the location of the received communications packet from the receive queue 710 of port 702 to a transmit queue of one of the ports 702–707. Conversely, when one of ports 702–707 receives a communications packet addressed to a network device linked to the network medium associated with port 702, that port obtains a memory location into which the received communications packet is stored, and stores a reference to the memory location, possibly along with additional information, into a message descriptor in the receive queue associated with the port. The network multiplexer then transfers the message descriptor from the receive queue of the port that received the communications packet to the transmit queue 708 of port 702 to allow port 702 to forward the received communications packet to the network medium associated with port 702. Of course, in the case that destination network addresses cannot be found in the address table 712, as discussed above, then the network multiplexer must place copies of the message descriptor into each transmit queue of each port, a process called "flooding." The network multiplexer is responsible for maintaining message descriptors in the receive queues of all ports that refer to free locations in memory into which received communications packets can be stored. There are many well-known approaches to maintaining message descriptors in receive queues, and this aspect of network multiplexer logic will not be further discussed or treated in a subsequent illustrative pseudo-code implementation.

Figure 8:
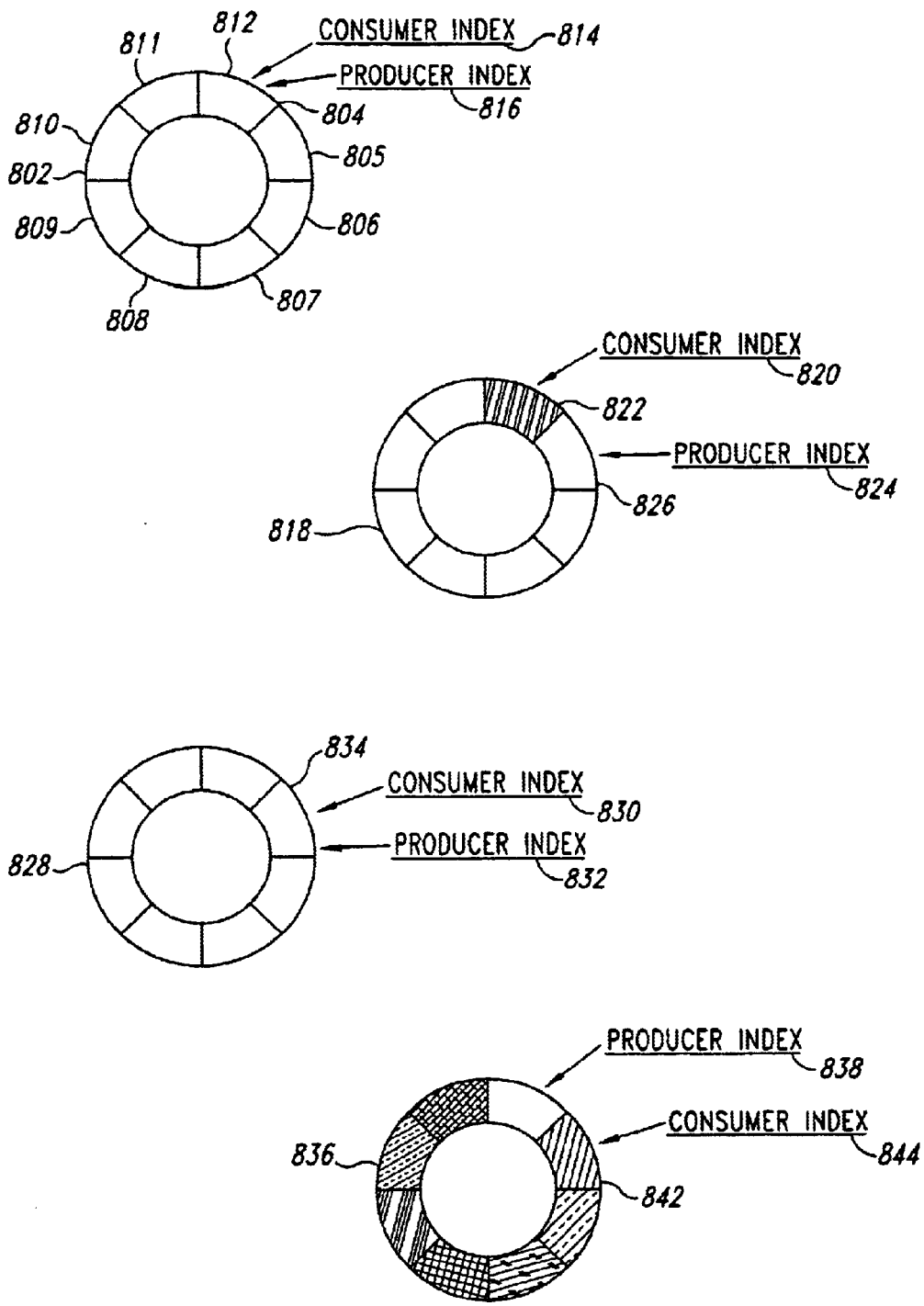
FIG. 8 illustrates the circular queue data structure used for transmit and receive queues in a network multiplexer.

Generally, circular queues are employed by network multiplexers and communications controllers for both receive queues and transmit queues. FIG. 8 illustrates the circular queue data structure used for transmit and receive queues in a network multiplexer. A circular queue is a first-in-first-out ("FIFO") queue that is logically represented in a circular fashion, such as the depiction of the circular queue 802 at the top of FIG. 8. Each radial section 804–812, or slot, of a circular queue contains space for a queue entry, in the case of network multiplexers, a message descriptor. The circular queue 802 in FIG. 8 is shown with 8 queue entry slots 804–812 although, in practice, a circular queue may have many tens or hundreds of queue entries. In addition to the queue entry slots, a circular queue is associated with two pointers: (1) a consumer index that points to the next queue entry that can be removed from the circular queue by a consumer of queue entries; and (2) a producer index that points to the next open slot within the circular queue in which a producer can place a queue entry to be added to the queue. Alternatively, the consumer index may be called the "tail" and the producer index may be called the "head." In an empty circular queue 802, in which all the queue entry slots are available for placement of data by a producer and in which none of the queue entry slots contain valid queue entries to be consumed by a consumer, both the consumer index 814 and the producer index 816 point to the same empty queue entry slot 812.

When a producer adds a queue entry to an empty circular queue 802, a circular queue with one valid queue entry 818 is produced. The consumer index 820 is not changed, as a result of which the consumer index points to the single valid queue entry 822 in the circular queue 818. After the producer inserts the queue entry 822, the producer increments the producer index 824 to point to the next available slot 826 within the circular queue 818 into which the producer can add a second queue entry. If the consumer now removes the single queue entry 822, an empty circular queue 828 is produced. When the consumer has removed the available queue entry 822, the consumer increments the consumer index 830. As in the previous depiction of an empty circular queue 802, the empty circular queue 828 produced by removing the single queue entry 822 has both the consumer index 830 and the producer index 832 pointing to the same empty, available queue entry slot 834. If a producer successively adds queue entries at a faster rate than a consumer can consume them, a full circular queue 836 will eventually be produced. In a full circular queue 836, the producer index 838 points to a single empty queue entry slot within the circular queue that immediately precedes the first available valid queue entry 842 pointed to by the consumer index 844.

An efficient and economical implementation of the address table (712 in FIG. 7) is required by the network multiplexer. Because the network multiplexer must handle hundreds or thousands of communications packets per second, the network multiplexer must be able to rapidly, and computationally efficiently identify an entry in the address table 712 corresponding to the destination address of an incoming communications packet. Because, for technical and economic reasons, the memory (324 in FIG. 3) of a network multiplexer is of limited size, the address table implementation must efficiently index the address table by applying a discrete mathematical function to destination addresses to produce numerical indexes, or references, that point to the locations of stored network addresses within the address table. The discrete mathematical function must map trillions of potential addresses into a finite number of address table entries, and should fairly evenly distribute mappings among the entries. Because memory space is limited, the hashing function needs to use as many entries as possible within the address table in order not to waste entries and in order to minimize mappings of different entries to a given entry. For these reasons, reshuffling is employed in the present invention.

In the discussion below, a hypothetical network medium is assumed in which source and destination addresses have a fixed length of 32 bits. The techniques and implementation to be discussed below are equally applicable to 48-bit, 64-bit, 128-bit, and larger source and destination network addresses; the only provision being that the data type required for storing addresses must be defined to be sufficiently large to accommodate the largest possible address, and hashing functions may need to be tailored to hash addresses of different sizes. A 32-bit address is assumed in the discussion below so that an address can be easily represented as a single integer. Larger addresses can be stored in long integers or in character arrays, as required by the particular hardware and software platforms on which the implementation is designed to run.

Figure 9:
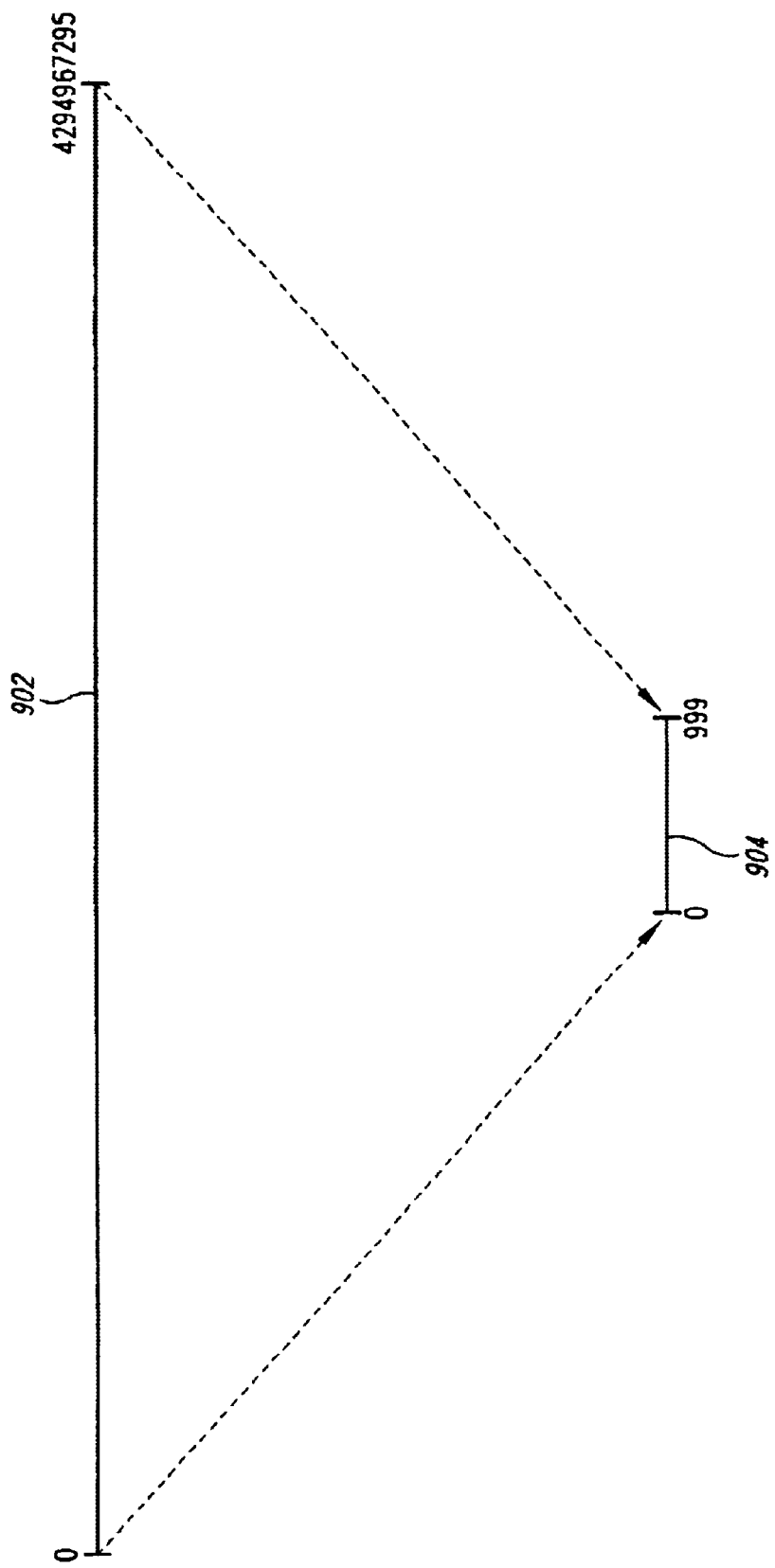
FIG. 9 illustrates the essential nature of a hash function.

FIG. 9 illustrates the essential nature of a hash function. The hash function must map, in the case of 32-bit addresses, 4294967296 different addresses, represented in FIG. 9 by horizontal line segment 902, to a much smaller set of contiguous hash table indexes, represented in FIG. 9 by line segment 904. In the current discussion, an address table having 1000 entries is assumed, but different sized address tables are easily implemented by changing one parameter of each hash function used to generate address table indexes. Of course, because a large address base is being mapped to a relatively tiny index space, even when the mapping effected by the discrete mathematical hash function relatively evenly distributes the potential addresses across the index space, millions of potential addresses may map to a given index.

Figure 10:
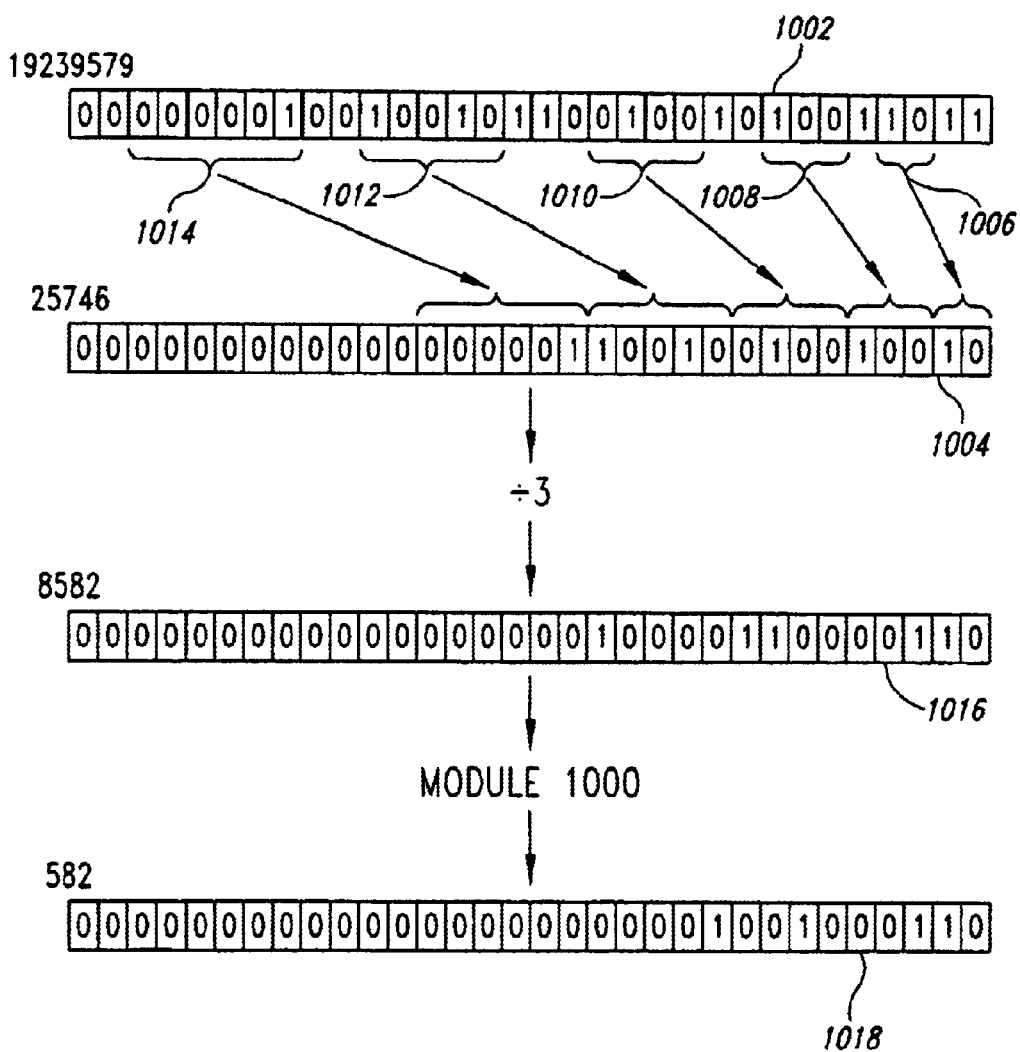
FIG. 10 illustrates one possible hash function.

FIG. 10 illustrates one possible hash function. The address 19239579 is represented in binary notation within a 32-bit memory storage location 1002. The binary notation representation of the address is 10010010110010010100011011. In the first step, the hash function selects a subset of the bits from the 32-bit storage location and compresses them into a contiguous string of 20 bits in a second storage location 1004. In the particular hash function illustrated in FIG. 10, assuming bit addresses starting at 0 and ending at 31 within a 32-bit storage location, bits 2–3 1006, 5–7 1008, 10–13 1010, 17–21 1012, and 24–29 1014, are selected and compressed together to form the 20-bit sequence stored in memory location 1004. Next, the number represented by the 20-bit bit string in memory location 1004 is arithmetically divided by 3 to produce the number 8582, represented in binary notation as 1000011000110, stored in memory location 1016. Finally, the remainder of the number 8582 stored in memory location 1016 divided by 1000 is stored in memory location 1018, and represents the index 582 generated by the hash function to correspond to the original address 19239579.

Figure 11:
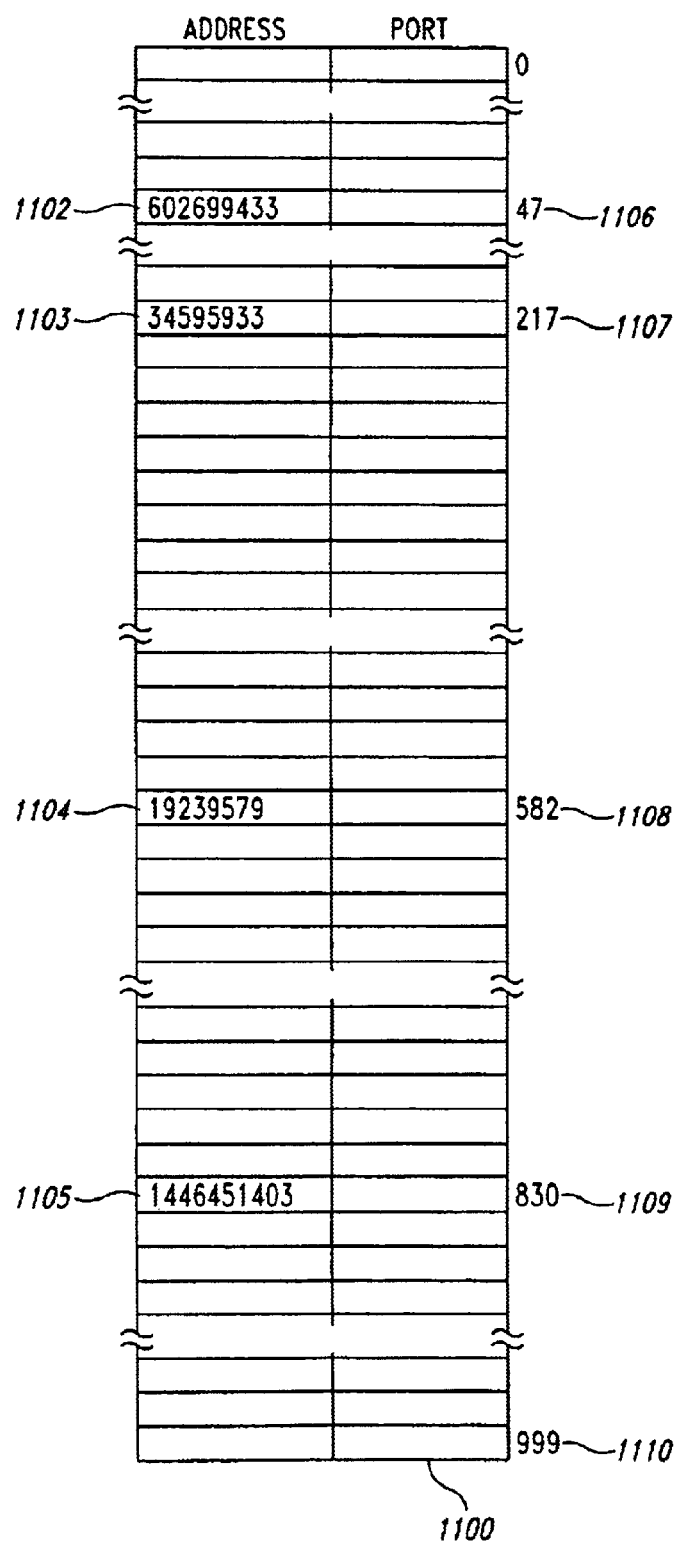
FIG. 11 shows an address table having 1000 potential entries.

FIG. 11 shows an address table having 1000 potential entries. In FIG. 11, four addresses 1102–1105 are shown located within the address table 1100 at the indexes 1106–1110 produced by the hash function illustrated in FIG. 10. FIG. 12 shows a simple C++-like implementation of the hash function illustrated in FIG. 10. A class "hash" is declared in FIG. 12 on lines 7–16. For the purposes of discussion of the present invention, the class "hash" includes a single member function "hashAddress," declared on line 13, as well as a constructor and destructor declared on lines 14 and 15.

The hash data member "tab," declared on line 10, defines an address table containing address/port pair entries as displayed in FIG. 11. An implementation for the member function "hashAddress" is provided on lines 19–41. The member function "hashAddress" takes two input arguments: (1) "source," the source network address of an incoming communications packet; and (2) "port," a numerical indication of the port through which the communications packet has been received. The arithmetic manipulations on lines 23–28 implement the discrete mathematical function illustrated in FIG. 10. Finally, if the address table entry at the calculated index "dex" is empty, indicated by the address field within the entry containing 0, as detected on line 29, both the input source address and input port are stored into the empty entry on lines 31–32, and the member function "hashAddress" returns a Boolean value TRUE to indicate that the input source address and port were successfully stored in the address table. If, on the other hand, the address table entry at the calculated index "dex" already contains the input source address, as detected by hashAddress on line 35, then the input port is stored within the entry and hashAddress returns the Boolean value TRUE. However, in all other cases, hashAddress returns the Boolean value FALSE, on line 40, to indicate that a collision has occurred in the address table and that the source address could not be stored within the address table.

Figure 13:
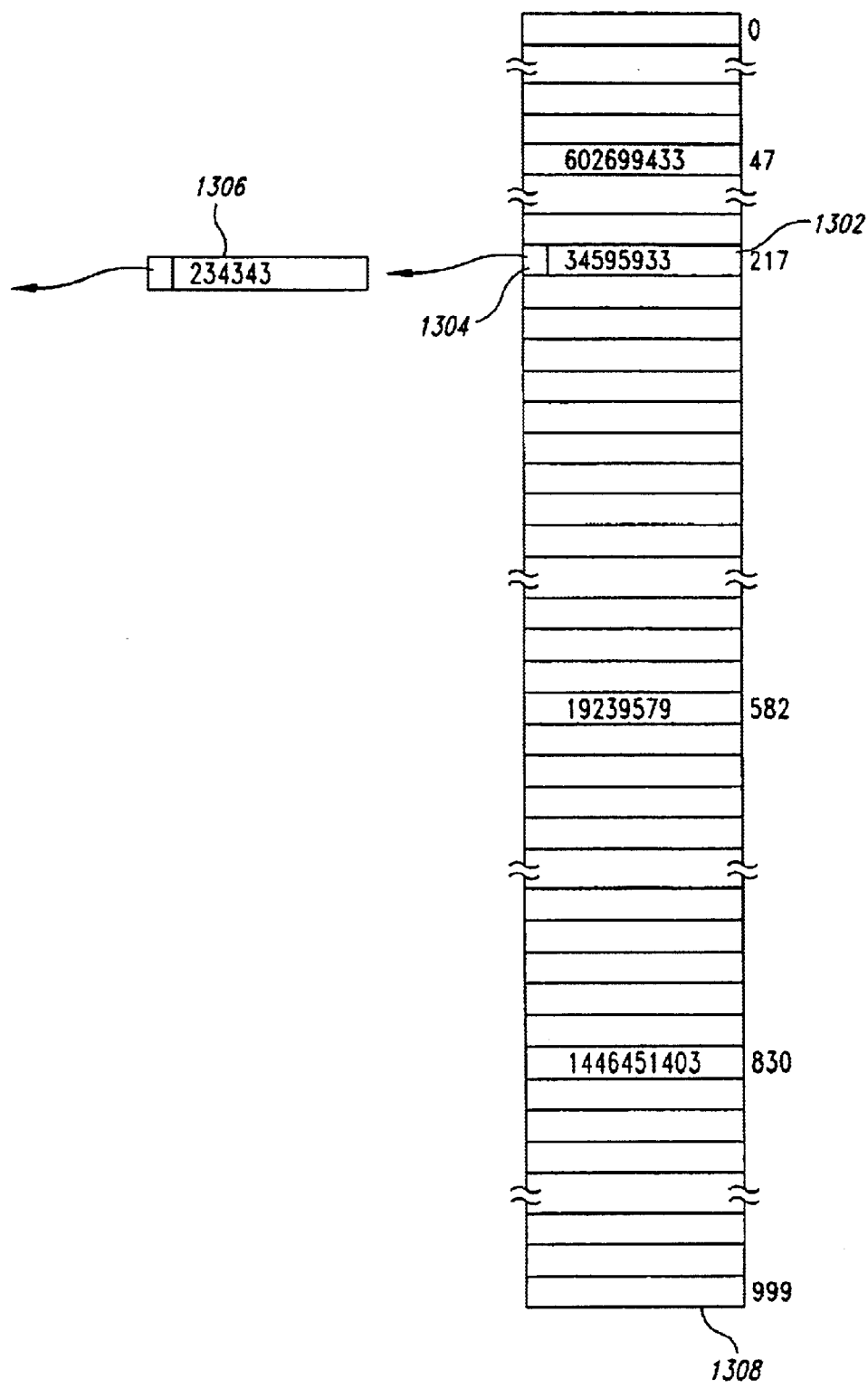
FIG. 13 illustrates the address table of FIG. 11 following an attempt to enter a fifth source address.

FIG. 13 illustrates the address table of FIG. 11 following an attempt to enter a fifth source address. Note that in FIG. 13, and in FIG. 16 below, only the address portion of the address table entries are shown since, for the purposes of the discussion, the port associations are not relevant. Application of the hash function illustrated in FIG. 10 to the source address 234343 produces the index 217. In the address table illustrated in FIGS. 11 and 13, the entry at index 217 (1302 in FIG. 13) is already occupied by source address 34595933. In this case, a collision has occurred, and the member function "hashAddress" shown in FIG. 12 returns a Boolean FALSE value. In common hash table implementations, there are a number of approaches to handling collisions. In one popular approach, illustrated in FIG. 13, an extra pointer field is included in each entry, for example pointer field 1304 in entry 1302, that points to a linked list of additional entries, commonly called collision buckets, in which colliding entries can be inserted. For example, in FIG. 13, a new entry 1306 is the first collision bucket of the linked list of collision buckets pointed to by the pointer in the pointer field 1304. In some implementations, collision buckets are allocated from a separate area of memory distinct form the memory containing the initial entries of the address table 1308. In yet other implementations, collision buckets comprise consecutive entries before or after the entry indexed by application of a hash function to an address. However, construction of linked lists of collision buckets is a relatively complex computational task that is not easily and economically implemented in hardware logic circuits within an IC implementation of network multiplexer control functionality. Including collision buckets within the address table may, in cases where the hash function unevenly distributes addresses over entries, result in inefficient use of memory.

A second technique to address the problem of hash function collisions is to apply a series of different hash functions to any particular source address to produce a set of possible indexes for that source address, and to store the source address in the first available entry having an index calculated by one of the applied hash functions. FIG. 14 shows an alternate implementation of the member function "hashAddress" that applies a series of different hash functions to a source address in an attempt to find an available address table entry. In the implementation of hashAddress shown in FIG. 14, a series of indexes is computed in the for-loop comprising lines 11–25. Each hash function differs in the integer chosen to divide the 20-bits selected from the input 32-bit address (104 in FIG. 10) in order to produce the second intermediate result (1016 in FIG. 10). In the original hash function of FIG. 12, the twenty-bit intermediate result was divided by the integer three. In the alternate implementation of hashAddress of FIG. 14, the 20-bit intermediate result (1004 in FIG. 10) is divided, in successive iterations of the for-loop comprising lines 11–25, by a succession of increasing odd integers starting with three. Thus, the first of the set of hash functions is equivalent to the hash function of FIGS. 10 and 11. Successive hash functions divide the 20-bit intermediate result by the integers 5, 7, 9, 11, 13 . . . As before, if an address table entry is found that is either empty or that already contains the input source address, then the input source and input port are stored into the address table, but if, after applying all of the successive hash functions, no empty entry or entry already containing the input source address is found, then the member function, as before, returns the Boolean value FALSE on line 26. This approach is used for illustrative purposes only. This approach may tend to result in a high probability of collisions at low numbered indexes, depending on the distribution of addresses for which indexes are computed. A large variety of different approaches to generating successive hash functions that result in even distribution of computed indexes over the entries in an address table are available, and, if the probable distribution of addresses to be indexed can be estimated, an approach to generating successive hash functions can be selected to evenly distribute indexes based on the estimated distribution of addresses. The present invention is not limited to any particular approach to generating a series of hash functions to be successively applied, as necessary, to an address in order to find an empty entry or to locate the address already resident within the address table.

Figure 16:
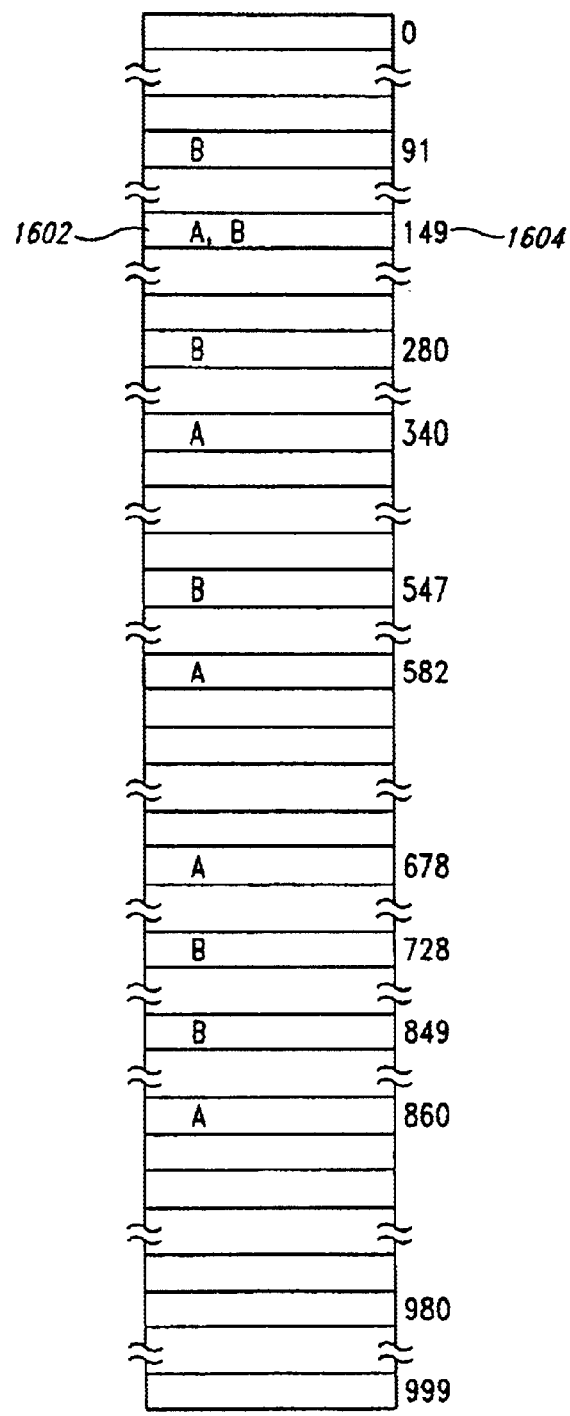
FIG. 16 shows the distribution of the indexes computed for the first two source addresses in the table of FIG. 15 within an address table having 1000 possible entries.

FIG. 15 shows a table containing the various indexes calculated by application of successive hash functions to a number of different source addresses. FIG. 16 shows the distribution of the indexes computed for the first two source addresses in the table of FIG. 15 within an address table having 1000 possible entries. In FIG. 16, the letter "A" stands for the source address "19239579" and the letter "B" stands for the source address "134873423." Note that, although the two source addresses "19239579" (A) and "134873423" (B) both collide at the entry (1602 in FIG. 16) with index 149 (1604 in FIG. 16), computed for address "19239579" by the second hash function and computed for address "134873423" by the fifth hash function, respectively, the remaining indexes computed for the two addresses do not collide. Thus, by applying multiple hash functions, source addresses that collide on application of one hash function can normally be resolved by application of a successive hash function. Thus, as a result, addresses can be more efficiently packed within a finite-sized address table.

Figure 17:
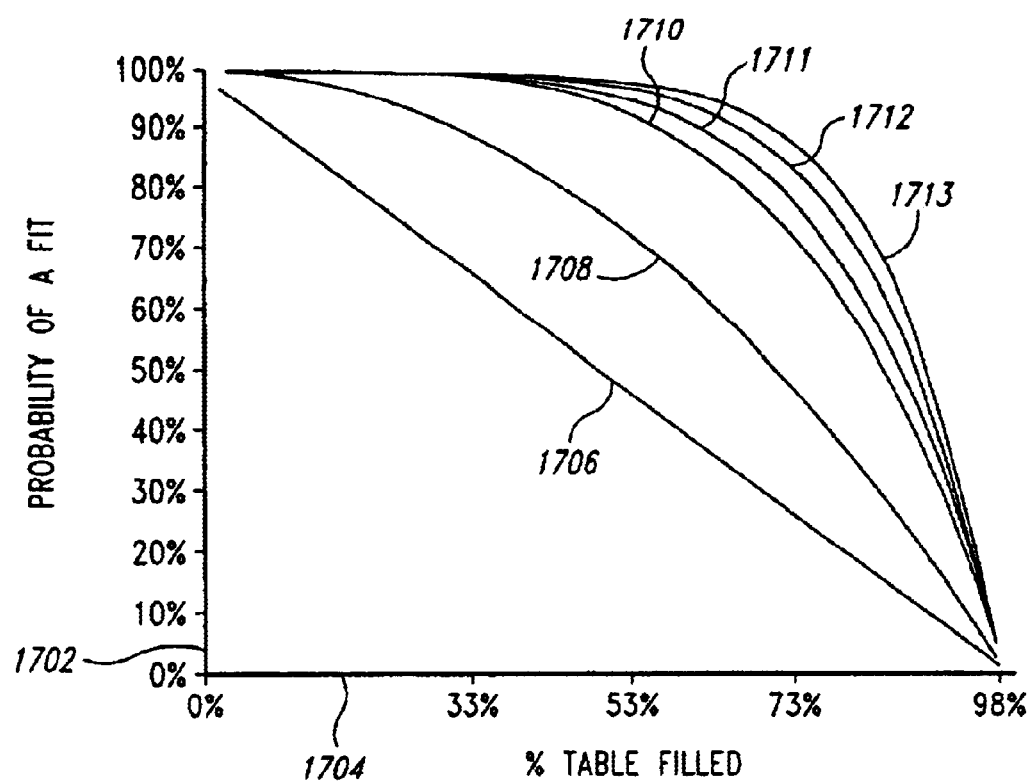
FIG. 17 illustrates the increased efficiency of table entry usage within a hash table by application of multiple hash functions.

FIG. 17 illustrates the increased efficiency of table entry usage within a hash table by application of multiple hash functions. In FIG. 17, the vertical axis 1702 shows the probability of inserting an input source address into an address table and the horizontal axis 1704 shows the percent of entries within the address table already filled. The curve 1706 shows the decrease in probability in fitting an incoming source address into the address table, as the address table becomes increasingly filled, when only a single hash function, such as the hash function illustrated in FIG. 10, is employed. Note that the probability of finding a suitable entry for an input source address falls linearly with an increase in the percentage of entries within the address table already filled. Curve 1708 shows the decrease in the probability of inserting an input source address into an address table with an increasing percentage of the table already filled when two hash functions are successively applied to an input source address, in the case of that the first hash function does not produce a suitable index for the source address. Note that, by applying two hash functions, there is a significantly greater probability of inserting an input source address regardless of the extent to which the address table is already filled. Curves 1710–1713 show the probability of inserting an input source address versus the extent to which the address table is already filled when 3, 4, 5, and 6 successive hash functions may be applied to an input address, respectively. Although the probability of inputting an input address increases for each increase in the number of hash functions that may be applied to an address, the increases achieved for each successive hash function decrease, so that the technique of applying multiple hash functions eventually produces significantly diminishing returns. In general, a point is quickly reached where the computational costs of applying an additional hash function outweighs the relatively small increased chance of inserting an input source address.

Figure 18B:
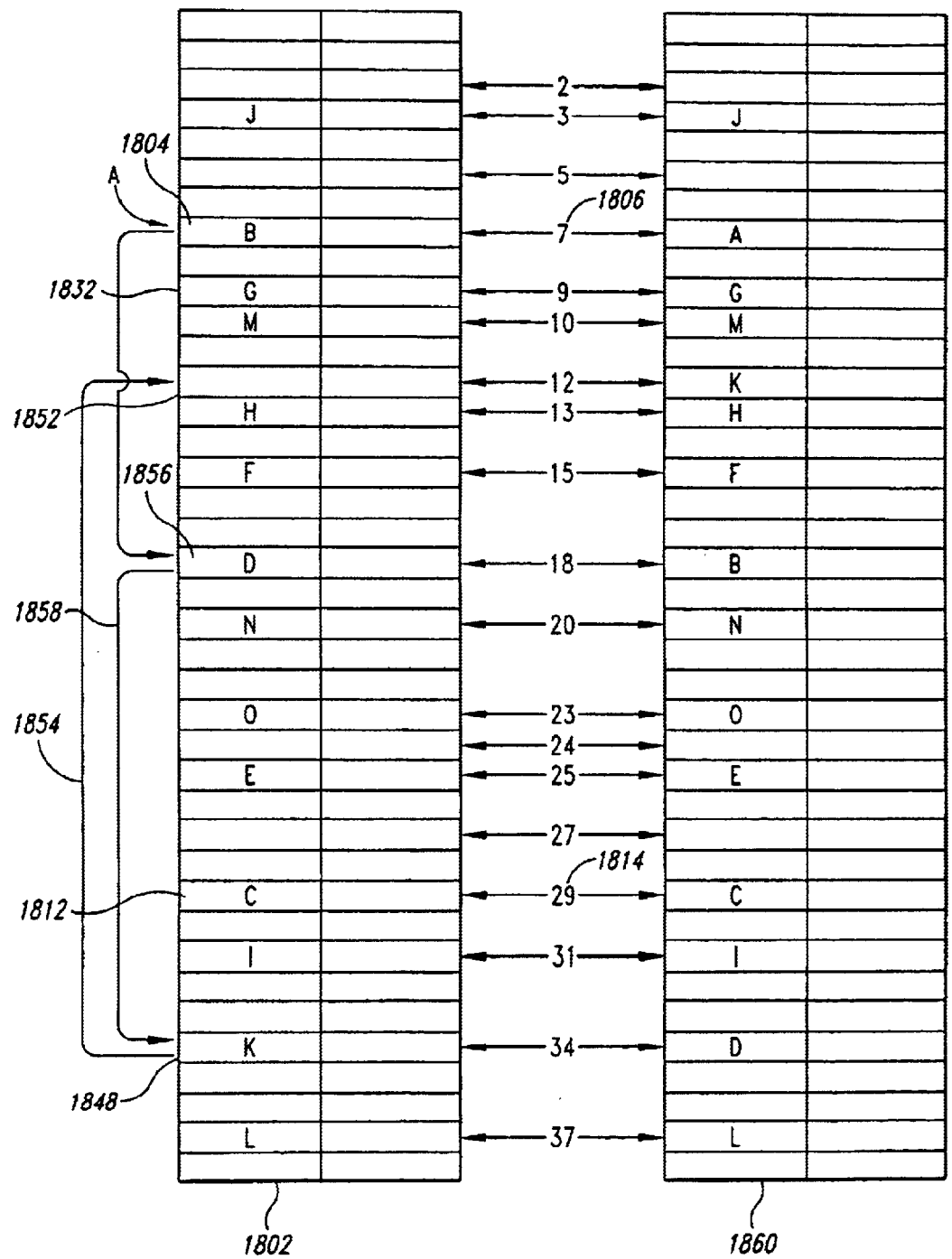
Figure 18C:
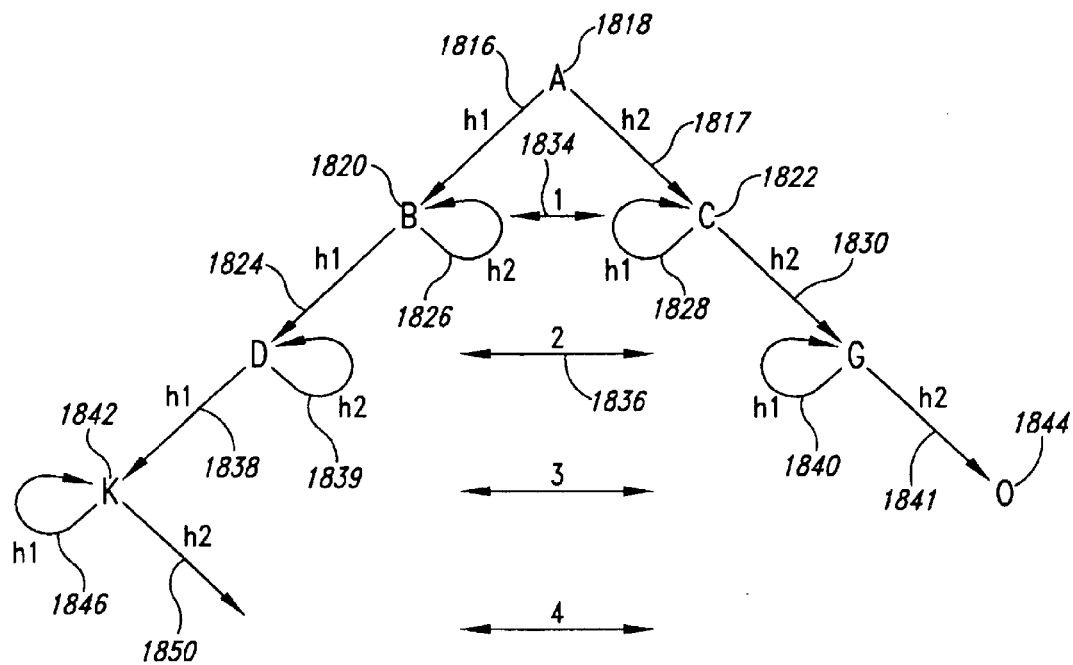

FIGS. 18A–18C illustrate the technique of hash table reshuffling. Hash table reshuffling is employed to further increase the efficiency of use of table entries within a hash table of finite size. In the example illustrated in FIG. 18A–C, two hash functions "h1" and "h2" may be applied to a given input source address in order to calculate two possible indexes of a potential entry in the address table into which the input source address can be entered. FIG. 18A shows the indexes produced by hash functions "h1" and "h2" applied to source addresses "A"–"O." In FIG. 18B, the left-hand address table 1802 includes entries containing source addresses "B"–"O." For example, entry 1804 having index 7 (1806 in FIG. 18) contains the source address "B" for which the index 7 (1806 in FIG. 18) was generated by applying the second hash function "h2" to the source address "B," as shown in row 1808 of the table shown in FIG. 18A. In address table 1802 of FIG. 18B, the indexes of the entries containing the source addresses "B"–"O" are all computed directly from source addresses "B"–"O" by application of either hash function "h1" or hash function "h2" to the respective source addresses, as can be verified by inspection FIGS. 18A–B.

Consider a subsequent attempt to input source address A into the address table 1802. Inspection of row 1810 of the table shown in FIG. 18A indicates that source address "A" may reside in entries having indexes 7 or 29. However, source address "B" already resides in the entry 1804 having index 7 (1806 in FIG. 18) and source address "C" already resides in the entry (1812 in FIG. 18) having index 29 (1814 in FIG. 18). Thus, it appears that source address "A" cannot be added to address table 1802 based on application of the two hash functions "h1" and "h2."

The technique of hash table reshuffling can be applied in order to make space in address table 1802 for source address "A." The process of hash table reshuffling is illustrated in FIGS. 18B–C. In FIG. 18C, application of hash functions "h1" and "h2" to source addresses is indicated by directed arrows labeled by "h1" and "h2," respectively. The process of hash table reshuffling begins, in FIG. 18C, with application of hash functions "h1" 1816 and "h2" 1817 to source address "A" 1818. As previously discussed and illustrated, application of hash function "h1" produces the index of an entry already containing source address "B" 1820 and application of hash function "h2" to source address "A" produces the index of an entry already containing source address "C" 1822. However, rather than stopping after two collisions, hash functions "h1" and "h2" are now applied to the source addresses "B" and "C" residing in the entries produced by application of hash functions "h1" and "h2" to source address "A." Application of hash function "h1" to source address "B" 1824 produces the index 18 in which, as can be seen in FIG. 18B, the source address "D" already resides. Application of the hash function "h2" to source address "B" 1826 produces the index 7 of the entry (1804 in FIG. 18) in which source address "B" already resides. Similarly, application of the hash function "h1" to source address "C" 1828 produces the index 29 of the entry 1812 in which the source address "C" already resides, and application of hash function "h2" to source address "C" 1830 produces the index 9 of an entry 1832 in which the source address "G" already resides. Application of hash functions "h1" and "h2" to source address "A" 1816 and 1817 constitutes a first level of the hash table reshuffling technique, indicated by the labeled line segment 1834 in FIG. 18C, and application of hash functions "h1" and "h2" to source addresses "B" and "C" constitutes a second level of the hash table reshuffling technique, indicated by line segment 1836 in FIG. 18C. Both the first and second levels of the hash table reshuffling technique, in the current case, fail to find a suitable entry for the input source address "A." Next, a third level of hash table reshuffling is applied to source addresses "D" 1838–1841 that identified the indexes of table entries already containing the source addresses "K" 1842 and "O" 1844. Next, a fifth level of hash table reshuffling begins. Application of hash function "h1" to the source address "K" 1846 produces the index 34 of the address table entry 1848 in which the source address "K" already resides. However, application of the hash function "h2" to source address "K" 1850 produces the index 12 of an empty address table entry 1852.

When the empty address table entry is found, the entry for source address "K" 1848 with index 34 can be moved to the empty entry 1852, indicated in FIG. 18B by arrow 1854. Now, entry 1848 is empty and the entry including source address "D" 1856 can be moved into entry 1848 in which source address "K" previously resided, indicated in FIG. 18B by arrow 1858. Then, the entry including source address "B" 1804 can be moved from entry 1804 into entry 1856 in which source address "D" previously resided. Now, entry 1804 is empty, and source address "A," which hashes to entry 1804 by application of hash function "h1," can be placed into entry 1804 in which source address "B" previously resided. Address table 1860 in FIG. 18B shows the locations of the various source addresses "A"–"O" following insertion of source address "A" by the above-described method of hash table reshuffling.

In the case where more hash functions can be applied to each source address, each level of hash table reshuffling will involve application of correspondingly more hash functions to the source addresses within that level. Thus, when six hash functions may be applied to a given source address, the first level of hash table reshuffling will potentially involve application of six hash functions, and the second level of hash table reshuffling may potentially involve application of 36 hash functions. With each increasing level of hash table reshuffling, the number of hash functions potentially applied increases by a factor equal to the number of hash functions that may be applied to a given source address.

Figure 19:
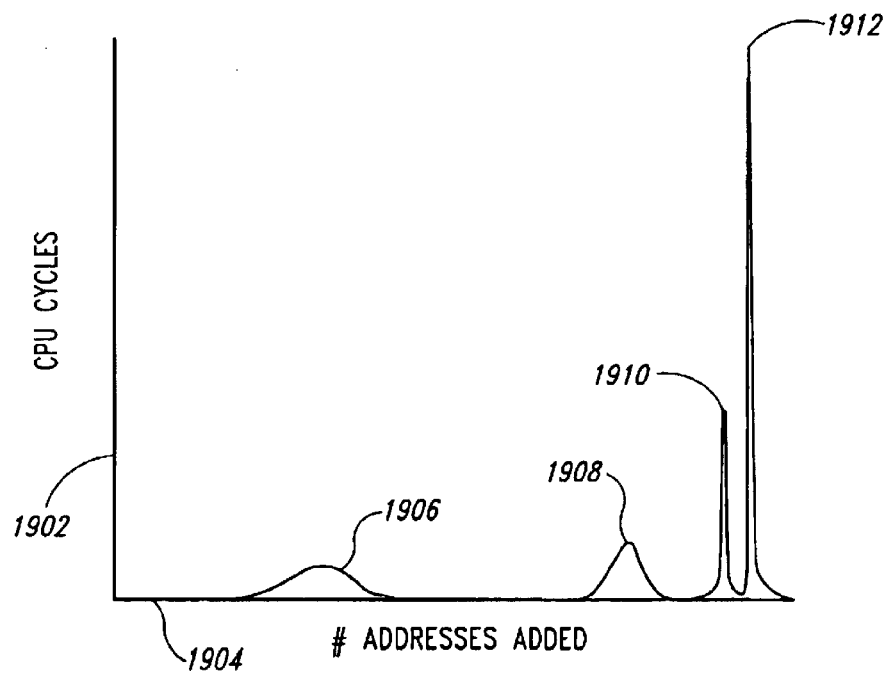
FIG. 19 illustrates experimental results obtained insertion of source addresses into an address table with 0, 1, 2, and 3 levels of hash table reshuffling.

FIG. 19 illustrates experimental results obtained from insertion of source addresses into an address table with 0, 1, 2, and 3 levels of hash table reshuffling. The vertical axis 1902 in FIG. 19 indicates increasing amount of processing expended to insert a set of addresses into an address table and the horizontal axis 1904 indicates the number of addresses added to an address table during a particular experiment. A number of different experiments were run to produce the results shown in FIG. 19. The first set of experiments, represented by the approximately bell-shaped curve 1906, were run with no hash table reshuffling. A second set of experiments 1908 were run with one level of hash table reshuffling. A third set of experiments 1910 was run with two levels of hash table reshuffling, and a fourth set of experiments 1912 were run with three levels of hash table reshuffling. Note that the average number of addresses added to an address table increases with increasing levels of has table reshuffling. However, note also that the computational effort required to add the addresses increases dramatically with increasing levels of hash table reshuffling. Thus, like the employment of multiple hash functions, hash table reshuffling can greatly increase the efficiency with which address table entries are utilized, but at the cost of increasing computational effort. Furthermore, multiple levels of hash table reshuffling is an algorithmically complex task that is not easily and economically implemented in logic circuits within an IC. As evidence of this fact, FIGS. 20A–B show a C++-like implementation of hash table reshuffling.

The present invention employs application of multiple hash functions, as in the implementation shown in FIG. 12, as well as a special type of hash table reshuffling in order to efficiently store input source addresses, where efficiency includes computational efficiency as well as memory efficiency. In the present invention, an incoming source address is repeatedly hashed using successive hash functions in order to attempt to identify an available slot within an address table in which to place the incoming source address, along with an indication of the port through which a communications packet bearing that source address was received, or to determine that the source address already resides within the address table. If, after applying a succession of hash functions, no available entry is found, and all the entries indexed by the indexes generated by application of the successful hash functions contain source addresses other than the input source address, then one of those entries is discarded, and the input source address is placed into the now empty entry from which the already entered entry was discarded. Over time, this approach is equivalent to employing multiple levels of hash table reshuffling. However, the hash table reshuffling is deferred until communications packets bearing source addresses of the discarded entries are again received by the network multiplexer. When such a previously-discarded source address is received, the multiple hash functions are applied to the source address to find an empty entry, and if an empty entry is not found, another entry already residing in the address table is discarded, and the previously discarded source address is placed into the empty slot resulting from discarding another entry. After the source address is discarded from the address table, if a communications packet is received bearing a destination address equal to the discarded source address, the network multiplexer will not find the destination address in the address table and will therefore need to forward the received network communications packet to all of the ports, or, in other words, to flood the communications packet bearing the discarded destination address. However, in most network protocols, the network device that received the forwarded packet will immediately respond by transmitting a reply, or acknowledgement, communications packet, and that reply communications packet will bear the discarded address as a source address. Thus, in general, the network multiplexer will only need to flood a communications packet bearing a discarded destination address one time before the discarded address is again received as a source address and entered into the address table. Thus, the cost of deferring the computational overhead of multiple levels of hash table reshuffling is the occasional need to flood communications packets bearing destination addresses discarded from the address table.

FIG. 21 shows an implementation of the deferred hash table reshuffling technique of the present invention. As before, a class "hash" is declared on lines 7–17. The class "hash" includes the data member "tab," declared on line 10, that represents an address table containing address/port pair entries. The class "hash" also includes a data member "rrobin," declared on line 11, that is a numerical indication of the hash function used to produce an index for an entry that will be next discarded, if necessary. The class "hash" includes the member function "hashAddress," declared on line 14, with input arguments equivalent to the input arguments of the member function "hashAddress" in FIG. 12. However, in the present invention, the member function "hashAddress" does not return a Boolean value, since an input source address will always be entered into the hash table.

The member function "hashAddress" of the present invention is implemented on lines 19–46. First, an intermediate result "inter" that is common to all successive hash functions is calculated on line 27. Then, in the for-loop comprising lines 28–42, successive hash functions are applied to the input source address. If an empty entry, or an entry already including the input source address, is found in the address table, then the input port and, if necessary, source are stored in the identified entry. However, if no such entry is found after applying a succession of hash functions, then the input source and port are stored in the entry indexed by the data member "rrobin" on lines 43–44 and the data member "rrobin" is incremented on line 45. Thus, a round robin approach is employed to select entries to discard.

Although the present invention has been described in terms of a particular embodiment, it is not intended that the invention be limited to this embodiment. Modifications within the spirit of the invention will be apparent to those skilled in the art. For example, the present invention may be implemented either as software or firmware routines using any number of different programming languages for use within any number of different types of network multiplexers. In addition, the present invention may be implemented as logic circuits included within an integrated circuit that implements the control functionality of a network multiplexer. Moreover, the present invention may be employed within any type of multiplexing electronic device in which associations between numerical quantities are acquired, stored, and referenced. A particular C++-like implementation was provided in the previous discussion, but an almost limitless number of different implementations for the present invention may be crafted by the skilled artisan. Moreover, an almost limitless number of different hash functions and sets of hash functions can be used.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for storing a value within an entry of a table that contains multiple entries, the method comprising:

iteratively applying successive hash functions to the value, in each iteration generating an index by application of a hash function and checking whether an entry indexed by the generated index is either empty or contains the value;

if the entry is empty, discontinuing iteratively applying successive hash functions to the value and storing the value in the entry indexed by the generated index; and if the entry indexed by the generated entry already contains the value, discontinuing iteratively applying successive hash functions to the value until a total number of successive hash functions have been applied to the value;

if an index has been generated for an empty entry by iterative application of successive hash functions, storing the value in the empty entry; and if an index has not been generated for either an empty entry or an entry already containing the value by iterative application of successive hash functions, storing the value in an entry indexed by an index generated during the iterative application of successive hash functions to the value.

2. The method of claim 1 embodied in hardware components of an electronic device.

3. The method of claim 1 embodied in firmware executed within an electronic device.

4. The method of claim 1 embodied in software executed within an electronic device.

5. The method of claim 1 implemented as a combination of hardware and software components within an electronic device.

6. The method of claim 1 wherein the table is an address table within a network multiplexer and each entry in the address table contains a network address/communications port association.

7. The method of claim 1 wherein each time an index is not generated for either an empty entry or an entry already containing a value by iterative application of successive hash functions, selecting an index generated during an iterative application of successive hash functions indicated by an integer value;

incrementing the integer value by one, and, when the updated integer value is greater than or equal to the total number of iterations of application of successive hash functions, setting the integer value to 0; and storing the value in an entry indexed by the selected index.

8. The method of claim 1 wherein each time an index is not generated for either an empty entry or an entry already containing a value by iterative application of successive hash functions, randomly selecting an index generated during an iterative application of successive hash functions indicated by an integer value; and storing the value in an entry indexed by the randomly selected index.

9. A network multiplexer comprising:

a number of ports, each port having a transceiver and a communications controller;

a memory;

an internal bus for transferring packets from ports to memory and from memory to ports;

a receive queue and a transmit queue associated with each port that contain message descriptors that reference packets stored in memory; and an address table, containing network address/port associations, locations for network address/port associations determined by iterative application of successive hash functions to a network address and, when access by iterative application of successive hash functions to a network address fails, by deferred hash table reshuffling, the address table employed when a packet is received by when a port is found associated in the address table with the destination network address of the received packet, the received packet is transmitted by the network multiplexer to the port, when no port is found associated in the address table for the destination network address of a received packet, the received packet is transmitted to all ports and a network address/communications port association is placed into the address table by iteratively applying successive hash functions to the network address, in each iteration generating an index by application of a hash function and checking whether an address table entry indexed by the generated index is either empty or contains the network address; and if the entry is empty, discontinuing iteratively applying successive hash functions to the network address and storing the network address/communications port association in the entry indexed by the generated index; and until a total number of successive hash functions have been applied to the network address;

if an index has been generated for an empty entry, storing the network address/communications port association in the entry indexed by the generated index; and if an index has not been generated for an empty entry, storing the network address/communications port association in an entry indexed by an index generated during the iterative application of successive hash functions to the network address.

* * * * *